July 6, 1965     J. M. MARLEY     3,192,586
QUICK-RELEASE FASTENING
Filed Oct. 15, 1962     2 Sheets-Sheet 1
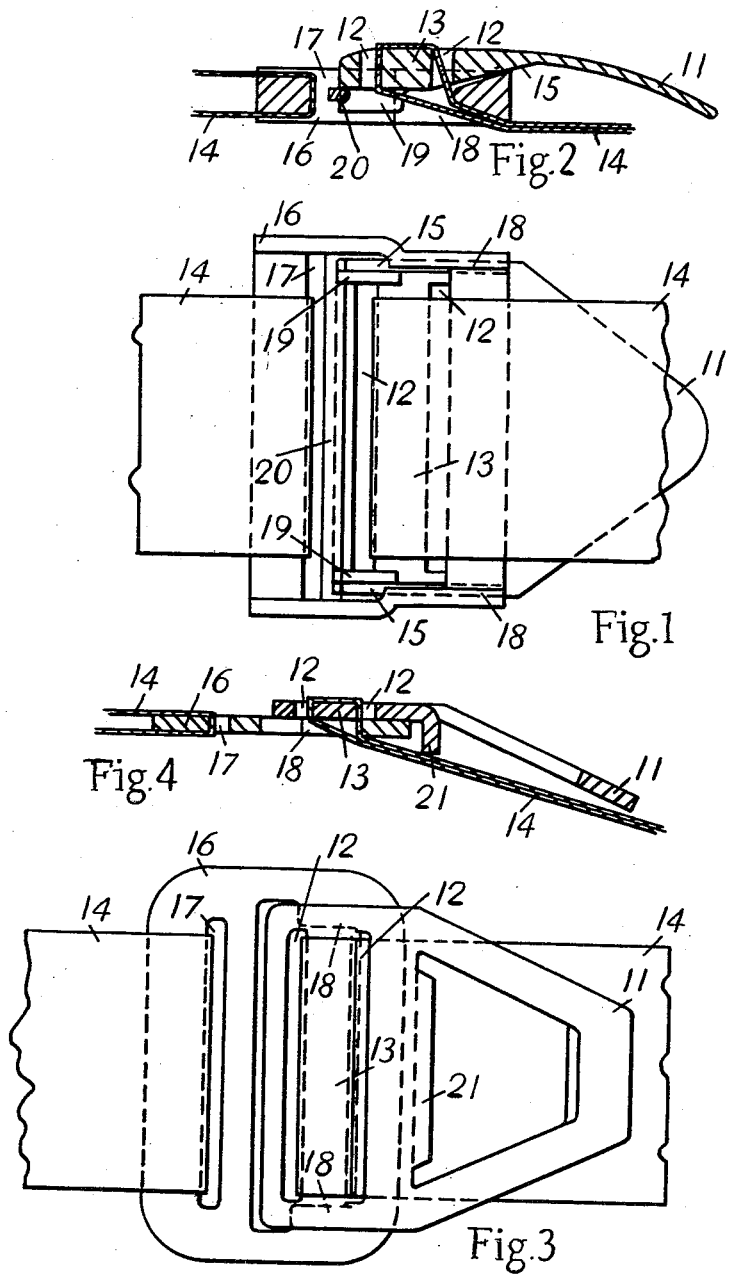

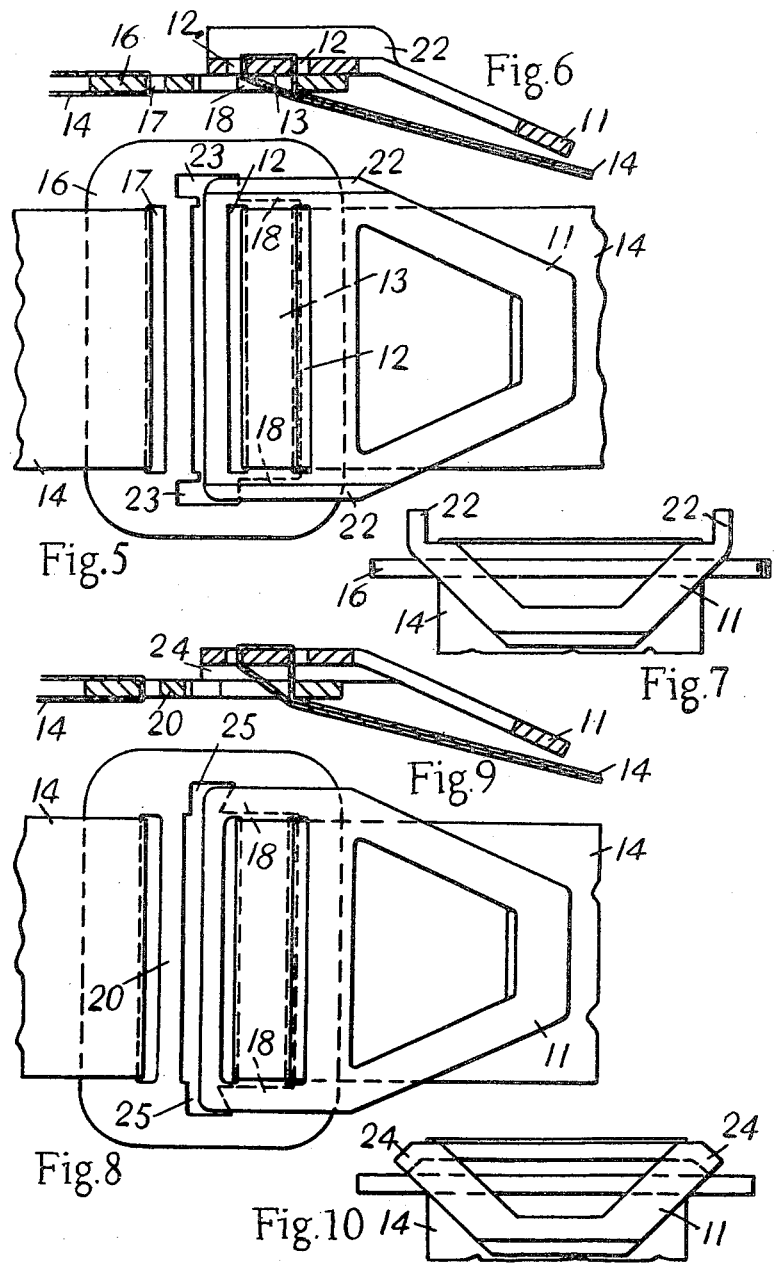

United States Patent Office 3,192,586
Patented July 6, 1965

3,192,586
QUICK-RELEASE FASTENING
John Meynell Marley, Whittington, near Lichfield, England, assignor to Clearway Couplings Limited, Sparkbrook, Birmingham, England
Filed Oct. 15, 1962, Ser. No. 230,630
Claims priority, application Great Britain, Nov. 21, 1961,
41,567/61
8 Claims. (Cl. 24—196)

This invention relates to a quick-release fastening of the kind which includes at least two parts which are adapted to be connected respectively to the two ends of a belt or strap, such belts or straps being commonly used as safety harnesses or forming part of safety harnesses for the occupants of road vehicles, aeroplanes and other vehicles.

The object of the present invention is to provide a new or improved construction of a quick-release fastening of the kind specified.

In accordance with the invention there is provided a quick-release fastening of the kind specified comprising a first belt attachment member which is adapted to be secured to one end of a belt, and a second belt attachment member which is provided with an aperture through which said first member can be passed and which is adapted at one end to be secured to the other end of the belt, the other end of said second member being provided on each lateral side with a projection which extends into said aperture and which is arranged on either of two opposite faces to engage the first member when the latter is assembled to the second member regardless of the direction in which said first member is passed through the second member.

The invention will now be more particularly described with reference to the accompanying drawings wherein FIGURES 1 and 2 are respectively a rear elevation and a sectional plan view of one example of a quick release fastening in accordance with the invention, FIGURES 3 and 4 are respectively a front elevation and a sectional plan view of an alternative embodiment, FIGURES 5, 6 and 7 are respectively a front elevation, a sectional plan view and an end elevation of a further alternative embodiment and FIGURES 8, 9 and 10 are similar views of a yet further alternative embodiment.

Referring to FIGURES 1 and 2 of the drawings there is provided a first belt attachment member 11 which is formed as an aluminium forging to a plate-like generally triangular configuration. Said member is provided with a pair of parallel slots 12 so that a bar 13 is formed between the slots, said bar being disposed somewhat nearer to one end of the member than the other. One end of a belt 14 can be secured to said member by passing said end round the aforementioned bar. Said first belt attachment member is also formed on each of its two opposite lateral sides with an undercut portion 15 which extends part-way along the length of the side so that said member is of reduced thickness along these portions as compared with the thickness of the rest of the member.

There is also provided a second belt attachment member 16 which is formed as an aluminium forging to a generally rectangular configuration and which is provided with an aperture so as to be of frame-like form. One end of said second member is provided with a slot 17 through which the other end of the belt can be passed and the other end of said second member is provided on each lateral side with a projection 18 in the form of a portion which extends part-way along the length of the adjacent side, each of said projections extending over the full depth of the associated side so as to be flush with the front and rear faces of the member 16. The maximum width of the aperture in the member 16 (i.e. the width of the portion of the aperture disposed between the projections 18 and the slot 17) is slightly greater than the overall width of the first member 11. Moreover the width of the aperture in the member 16 measured between the projections 18 is slightly greater than the width of the thickest portion of the first member 11 (i.e. the bar 13).

The fastening is assembled together by inserting the first member 11 through the aperture in the second member 16. During such assembly the undercut portions 15 on the member 11 pass through the widest part of the aperture whilst the bar 13 passes between the projections 18 on the second member 16. When the first member 11 has been passed completely through the aperture, it is turned about the bar 13 and the belt 14 is tightened. The first member 11 is thus moved to a position in which it lies in a plane generally parallel to the plane of the second member 16 and is disposed in the position shown in FIGURE 2. In this position the under cut portions 15 engage the projections 18 on the second member 16 and the first member 11 is located laterally between the projections 18 by shoulders formed at the connection of the undercut portions 15 to the bar 13. Furthermore, as previously stated, the projections extend over the full depth of the corresponding sides of the second member and it will be understood therefore that the first member can be passed through the aperture of the second member in either direction so that for the purpose of connecting the two members of the fastening it will not matter whether the belt 14 associated with the second member is twisted or not.

The slot in the second member through which the belt is passed may be of generally straight configuration as shown in FIGURE 1 or alternatively may be of a sinuous or wavy configuration (not shown) the arrangement in the latter case being such that the member exerts a light grip on the belt to prevent slip between said member and the belt.

Means are also provided for preventing complete insertion of the first belt attachment when the belt associated therewith is twisted through an odd number of half turns. Said means comprises a pair of projections 19 formed on the rear side of the first member 11, said projections being engageable with a bar 20 when the fastening is in the operative position shown in the drawings. Said projections 19 are spaced apart by a distance which is less than the width of that part of the aperture which are disposed the projections 18 of the second member 16. Moreover the projections 19 make the overall thickness of the first member in the region of said projections larger than the distance between the bar 20 and the adjacent ends of the projections 18 of the second member. Thus when the first member 11 is inserted into the aperture in the second member 16 with the front surface of the first member adjacent the bar 20 and the projections 19 projecting away from the bar 20, the member 11 passes completely through the aperture as the spacing of the projections 19 is less than that of the projections 18 on the second member 16. The fastening is then correctly assembled and easily released by lifting the end of the member 11. If, however, the first member is presented in a reversed orientation, with the rear surface of the member 11 adjacent the bar 20 and the projections 19 projecting towards the bar 20, the front surface of the first member 11 engages the ends of the projections 18 and the projections 19 engage the bar 20 and passage of the first member through the aperture is prevented.

In the alternative embodiment shown in FIGURES 3 and 4 the two belt attachment members 11, 16 are stamped from steel plate. The first member 11 is again formed with slots 12 providing a bar 13 but the undercut portion 15 is omitted. The second member 16 is formed with a slot 17 and projections 18. Once again means are provided for preventing complete insertion of the first member when reversed, said means comprising a flange 21 which projects from the rear face of the first member. The width of said flange 21 is less than the distance between the projections 18 of the second member 16 and makes the overall thickness of the first member in the region of the flange 21 larger than the distance between the bar 20 and the adjacent ends of the projections 18 of the second member. Thus the fastening shown in FIGURES 3 and 4 operates in a manner essentially similar to that shown in FIGURES 1 and 2.

In the further alternative embodiment shown in FIGURES 5, 6 and 7 the arrangement is generally similar to that shown in FIGURES 3 and 4 with the exception that the means for preventing complete insertion of the first member when reversed comprises a pair of laterally spaced and parallel flanges 22 which project from the front surface of the first member 11 and which can pass, when the first member is correctly presented, through recesses 23 formed in the second member extending from the aperture therein adjacent to the slot 17. When the first member 11 is presented in a reversed orientation the flanges 22 engage the projections 18 to prevent complete insertion of the first member.

In the yet further alternative embodiment shown in FIGURES 8, 9 and 10 the means for preventing complete insertion of the first member 11 when reversed again comprises a pair of laterally spaced flanges 24 which project from the rear surface of the first member, said flanges 24 being inclined to the plane of the first member 11. The flanges 24 can pass through recesses 25 formed in the projections 18 and extending from the aperture in the second member provided that the first member is correctly presented. If the first member is presented reversed the flanges 24 engage the bar 20 in the second member and prevent complete insertion.

Having thus described my invention what I claim as new and desire to secure by Letters Patent is:

1. A quick release fastening comprising the combination of a plate-like first belt attachment having a front surface and a rear surface, means on said first belt attachment member for the connection thereto of an end of a belt extending from the rear surface of the first belt attachment member, at least one projecting portion on said first belt attachment member, a second belt attachment member of generally rectangular frame-like form having identical front and rear surfaces and having formed therein an aperture of maximum width greater than the maximum width of the first belt attachment member for the passage therethrough of the first belt attachment member to assemble the first and second belt attachment members together, a pair of inward projections on said second belt attachment member which are each flush with the front and rear surfaces of the second belt attachment member, and project into the aperture therein from opposite lateral sides and engage the rear surface of the first belt attachment member when the first and second belt attachment members are assembled together, means on one end of the second belt attachment member for the connection thereto of an end of a belt, and means on said second belt attachment member engageable with said projecting portion on the first belt attachment member, when the latter is so presented to the second belt attachment member that the front surface of the first belt attachment member would engage said inward projections on the second belt attachment member, to prevent complete passage of the first belt attachment member through the aperture in the second belt attachment member.

2. A quick release fastening comprising the combination of a plate-like first belt attachment member having a front surface and a rear surface and being formed with a pair of slots, a bar formed between said slots by means of which an end of a belt, extending from the rear surface of the first belt attachment member, is secured thereto at least one projecting portion on said first belt attachment member, a second belt attachment member having identical front and rear surfaces and having formed therein an aperture of maximum width greater than the maximum width of the first belt attachment member for the passage therethrough of the first belt attachment member to assemble the first and second belt attachment members together, a pair of inward projections on said second belt attachment member, which are each flush with the front and rear surfaces of the second belt attachment member, and project into the aperture therein from opposite lateral sides and engage the rear surface of the first belt attachment member when the first and second belt attachment members are assembled together, the second belt attachment member being formed adjacent one end with a slot through which an end of a belt can be inserted, and means on said second belt attachment member engageable with said projecting portion on the first belt attachment member, when the latter is so presented to the second belt attachment member that the front surface of the first belt attachment member would engage said inward projections on the second belt attachment member, to prevent complete passage of the first belt attachment member through the aperture in the second belt attachment member.

3. A quick release fastening comprising the combination of a plate-like first belt attachment member having a front surface and a rear surface, and being formed with a pair of slots defining between them a bar for the connection to the first belt attachment member of an end of a belt extending from the rear surface of the first belt attachment member, at least one projecting portion on the rear surface of the first belt attachment member, a second belt attachment member of rectangular frame-like form having identical plane front and rear surfaces and having formed therein an aperture of maximum width greater than the maximum width of the first belt attachment member for the passage therethrough of the first belt attachment member to assemble the first and second belt attachment members together, a pair of inward projections on said second belt attachment member which are each flush with the front and rear surfaces of the second belt attachment member, and project into the aperture therein from opposite lateral sides and engage the rear surface of the first belt attachment member when the first and second belt attachment members are assembled together, the second belt attachment member being formed adjacent to one end with a slot through which an end of a belt can be inserted, and a bar on the second belt attachment member separating the aperture and the slot therein and being engageable with the projecting portion on the rear surface of the first attachment member, when the latter is so presented to the second belt attachment member that the front surface of the first belt attachment member would engage said inward projections on the second belt attachment member, to prevent complete passage of the first belt attachment member through the aperture in the second belt attachment member.

4. A quick release fastening comprising the combination of a plate-like first belt attachment member having a front surface and a rear surface, and being formed with a pair of slots defining between them a bar for the connection to the first belt attachment member of an end of a belt extending from the rear surface of the first belt attachment member, a pair of undercut portions formed respectively along two lateral edges of the first belt attachment member, said portions being undercut on the rear surface of the first belt attachment member, at least one projecting portion on the rear surface of the first belt attachment member and disposed between the undercut portions thereof, a second belt attachment member of generally rectangular frame-like form having identical plane front and rear surfaces and having formed therein an aperture of maximum width greater than the maximum width of the first belt attachment member for the passage therethrough said first belt attachment member is passed to assemble the first and second belt attachment members together, a pair of inward projections on said second belt attachment member, which are each flush with the front and rear surfaces of the second belt attachment member, and project into the aperture therein from opposite lateral sides and engage said undercut portions on the rear surface of the first belt attachment member when the first and second belt attachment members are assembled together, the second belt attachment member being formed adjacent one end with a slot through which an end of a belt can be inserted, and a bar on the second belt attachment member separating the aperture and the slot therein and being engageable with said projecting portion on the rear of the first belt attachment member, when the latter is so presented to the second belt attachment member that the front surface of the first belt attachment member would engage said inward projections on the second belt attachment member, to prevent complete passage of the first belt attachment member through the aperture in the second belt attachment member.

5. A quick release fastening as claimed in claim 4 wherein a pair of laterally spaced projecting portions are provided on the rear surface of the first belt attachment member.

6. A quick release fastening comprising the combination of a plate-like first belt attachment member having a front surface and a rear surface and being formed with a pair of slots, a bar formed between said slots by means of which an end of a belt, extending from the rear surface of the first belt attachment member, is secured thereto, a flange formed on said first belt attachment member projecting from the rear surface thereof, at a position spaced from said bar, the length of said flange being parallel to the length of said bar, a second belt attachment member of rectangular frame-like form having identical front and rear surfaces and having formed therein an aperture of maximum width greater than the maximum width of the first belt attachment member for passage therethrough of the first belt attachment member to assemble the first and second belt attachment members together, a pair of inward projections on said second belt attachment member, which are each flush with the front and rear surfaces of the second belt attachment member, and project into the aperture therein from opposite lateral sides and engage the rear surface of the first belt attachment member when the first and second belt attachment members are assembled together, the second belt attachment member being formed adjacent one end with a slot through which an end of a belt can be inserted, and a bar on the second belt attachment member separating said slot from said aperture and being engageable with the flange on the first belt attachment member, when the latter is so presented to the second belt attachment member that the front surface of the first belt attachment member would engage said inward projections on the second belt attachment member, to prevent complete passage of the first belt attachment member through the aperture in the second belt attachment member.

7. A quick release fastening comprising the combination of a plate-like first belt attachment member having a front surface and a rear surface, and being formed with a pair of slots, a bar formed between said slots by means of which an end of a belt, extending from the rear surface of the first belt attachment member, is secured thereto, a pair of flanges formed on opposite lateral sides of said first belt attachment member and projecting from the front surface thereof, a second belt attachment member of rectangular frame-like form having identical front and rear surfaces and having formed therein an aperture of maximum width greater than the maximum width of the first belt attachment member for passage therethrough of the first belt attachment member to assemble the first and second belt attachment members together, a pair of inward projections on said second belt attachment member, which are each flush with the front and rear surfaces of the second belt attachment member, and project into the aperture therein from opposite lateral sides and engage the rear surface of the first belt attachment member when the first and second belt attachment members are assembled together, said inward projections being also engageable respectively with said flanges on the first belt attachment member, when the latter is so presented that said flanges would engage the inward projections if the first and second belt attachment members were assembled together, to prevent complete passage of the first belt attachment member through the aperture, a pair of recesses on opposite lateral sides of said second belt attachment member which communicate with the aperture therein and through which the flanges on the first belt attachment member pass as the first belt attachment member is passed through the aperture in the second belt attachment member, and means at one end of the second belt attachment member for the connection thereto of an end of a belt.

8. A quick release fastening comprising the combination of a plate-like first belt attachment member having a front surface and a rear surface and being formed with a pair of slots, a bar formed between said slots by means of which an end of a belt, extending from the rear surface of the first belt attachment member, is secured thereto, a pair of inclined flanges formed on opposite lateral sides of said first belt attachment member and projecting from the rear surface thereof, a second belt attachment member of rectangular frame-like form having identical front and rear surfaces and having formed therein an aperture of maximum width greater than the maximum width of the first belt attachment member for the passage therethrough of the first belt attachment member to assemble the first and second belt attachment members together, a pair of inward projections on said second belt attachment member, which are each flush with the front and rear surfaces of the second belt attachment member, and project into the aperture therein from opposite lateral sides and engage the flanges on the rear surface of the first belt attachment member when the first and second belt attachment members are assembled together, a pair of re-entrant recesses formed respectively in said inward projections, through which recesses the flanges on the first belt attachment member pass as the first belt attachment member is passed through the aperture in the second belt attachment member, a pair of portions of the second belt attachment member adjacent respectively to said recesses being engageable with the flanges on the first belt attachment member, when the latter is so presented that the front surface of the first belt attachment would engage said inward projections, to prevent complete passage of the first belt attachment member through the aperture in the second belt attachment member, and means at one end of the second belt attachment member for the connection thereto of an end of a belt.

References Cited by the Examiner

UNITED STATES PATENTS

| 2,573,527 | 10/51 | White | 24—196 |
| 2,784,472 | 3/57 | Freysinger | 24—197 |
| 2,807,852 | 10/57 | Rave | 24—197 |
| 2,919,481 | 1/60 | Finken et al. | 24—196 |
| 3,060,537 | 10/62 | Hatfield | 23—197 |

FOREIGN PATENTS

| 961,738 | 11/49 | France. |
| 812,962 | 5/59 | Great Britain. |

DONLEY J. STOCKING, *Primary Examiner.*